(12) United States Patent
Hoexum et al.

(10) Patent No.: US 10,596,716 B2
(45) Date of Patent: Mar. 24, 2020

(54) GENERATING A GUIDANCE INDICATOR AND INDICATOR SIGNAL

(71) Applicant: KONINKLIJKE PHILIPS N.V., Eindhoven (NL)

(72) Inventors: Everhardus Johannes Hoexum, Eindhoven (NL); Luc Berntsen, Eindhoven (NL); Martijn Jan Kuitert, Eindhoven (NL); Julien Philippe Latul, Eindhoven (NL); Simone Dekker, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 16/315,189

(22) PCT Filed: Jul. 6, 2017

(86) PCT No.: PCT/EP2017/066982
§ 371 (c)(1),
(2) Date: Jan. 4, 2019

(87) PCT Pub. No.: WO2018/007547
PCT Pub. Date: Jan. 11, 2018

(65) Prior Publication Data
US 2019/0152075 A1    May 23, 2019

(30) Foreign Application Priority Data

Jul. 7, 2016 (EP) ..................... 16178469

(51) Int. Cl.
 *B26B 19/46* (2006.01)
 *B26B 19/38* (2006.01)
 (Continued)

(52) U.S. Cl.
 CPC ............ *B26B 19/388* (2013.01); *A45D 27/42* (2013.01); *A45D 40/30* (2013.01); *A45D 44/00* (2013.01);
 (Continued)

(58) Field of Classification Search
 CPC ... B26B 19/388; B26B 19/46; B26B 21/4081; B26B 21/4087; A45D 27/42;
 (Continued)

(56) References Cited

U.S. PATENT DOCUMENTS 9,925,676 B2 * 3/2018 Krenik ................ B26B 19/3806
2008/0175448 A1 * 7/2008 Fujiwara ............ G06K 9/00208
    382/118

(Continued)

FOREIGN PATENT DOCUMENTS

WO    2015067484 A1    5/2015
WO    2015067498 A1    5/2015
WO    2015067634 A1    5/2015

*Primary Examiner* — Nay Tun

(57) ABSTRACT

According to an aspect, there is provided a method comprising generating (202) a guidance indicator relating to a portion of a user; determining (204) a position of a portion of a portable device relative to the portion of the user; and generating (208) an indication signal when it is determined that at least a portion of the portable device is in a defined position relative to the guidance indicator. According to other aspects, apparatus and a machine readable medium are provided.

15 Claims, 4 Drawing Sheets

(51) Int. Cl.
  *G06F 3/01* (2006.01)
  *G06F 3/0346* (2013.01)
  *B26B 21/40* (2006.01)
  *A45D 44/00* (2006.01)
  *A45D 40/30* (2006.01)
  *G06F 3/0481* (2013.01)
  *A45D 27/42* (2006.01)
  *A45D 27/00* (2006.01)

(52) U.S. Cl.
  CPC .......... *B26B 19/46* (2013.01); *B26B 21/4081* (2013.01); *B26B 21/4087* (2013.01); *G06F 3/011* (2013.01); *G06F 3/0346* (2013.01); *G06F 3/0481* (2013.01); *A45D 27/00* (2013.01); *A45D 2200/20* (2013.01); *A45D 2200/205* (2013.01)

(58) Field of Classification Search
  CPC ........ A45D 40/30; A45D 44/00; A45D 27/00; A45D 2200/20; A45D 2200/205; G06F 3/011; G06F 3/0346; G06F 3/0481
  See application file for complete search history.

(56) References Cited

U.S. PATENT DOCUMENTS

| | | | |
|---|---|---|---|
| 2010/0186234 A1* | 7/2010 | Binder | A45D 26/00 30/34.05 |
| 2011/0018985 A1* | 1/2011 | Zhu | A45D 44/00 348/61 |
| 2013/0021460 A1 | 1/2013 | Burdoucci | |
| 2015/0197016 A1 | 7/2015 | Krenik | |
| 2015/0217465 A1* | 8/2015 | Krenik | B26B 19/388 700/90 |
| 2016/0262521 A1* | 9/2016 | Kustra | A45D 24/36 |

* cited by examiner

GENERATING A GUIDANCE INDICATOR AND INDICATOR SIGNAL

This application is the U.S. National Phase application under 35 U.S.C. § 371 of International Application No. PCT/EP2017/066982, filed on Jul. 6, 2017, which claims the benefit of International Application No. 16178469.9 filed on Jul. 7, 2016. These applications are hereby incorporated by reference herein.

TECHNICAL FIELD OF THE INVENTION

The invention relates to providing guidance to a user of a portable device and, more particularly, to presenting a guidance indicator to a user.

BACKGROUND OF THE INVENTION

When performing a personal care activity, such as applying make-up, performing a skin care activity, shaving and hair trimming, it is often desirable to perform the particular activity accurately in order to achieve the desired result. For example, when trimming a beard, a user may intend that the beard be trimmed similarly on both sides of the face, and may intend for the beard to appear symmetrical.

Using existing techniques, achieving high levels of accuracy can be difficult. For example, when applying make-up, it can be difficult to determine whether a product has been applied equally, and to the same level or position, on both sides of one's face. In the beard trimming example, if hair is trimmed too much on one side of a face, additional trimming may be required on the other side of the face in order for the remaining hair to look symmetrical.

SUMMARY OF THE INVENTION

According to an embodiment, a method comprises generating a guidance indicator relating to a portion of a user; determining a position of a portion of a portable device relative to the portion of the user; and generating an indication signal when it is determined that at least a portion of the portable device is in a defined position relative to the guidance indicator.

The method may further comprise generating a marker representing the portion of the portable device; presenting the guidance indicator on a representation of the portion of the user; and presenting the marker representing the portion of the portable device on the representation of the portion of the user.

The disclosed method provides advantages in that a user is able to tell (either from seeing the representation or from receiving an indication signal) whether a portable device they are using is being applied as intended, and reduces the chance of a user inadvertently using the device in an unintended area. This has particular advantages in the field of personal care, for example hair trimming and shaving. For example, use of the method can make it easier for a user to achieve a desired look when grooming their face.

The marker may comprise a plurality of dots representative of at least ends of the portion of the portable device. In some embodiments, a series of dots may be displayed, the shape of which is representative of the portion of the portable device.

The portion of the portable device may comprise a treatment element of a treatment device. The marker may comprise a line representative of the treatment element of the treatment device. The guidance indicator may define an area or at least a portion of a boundary of an area into which the treatment element is not to be moved.

In some examples, the indication signal may comprise at least one indication signal selected from a group comprising: a change in a colour of the marker, a change in a colour of the guidance indicator, an audible signal, a visual signal, a haptic signal, and an instruction to the portable device. Such an instruction to the portable device may include an instruction, for example, to start operating the portable device or a portion thereof, or to stop operating the portable device or a portion thereof.

In some embodiments, the representation may comprise a virtual representation which is not visible to, or presented to the user. An advantage of this embodiment is that the user may use the portable device without viewing their reflection or their representation in a video. The indication signal may cause appropriate action to be taken automatically if the portion of the portable device is detected in a particular defined position relative to the guidance indicator.

According to a further embodiment, an apparatus comprises a controller. The controller is configured to generate a guidance indicator relating to a portion of a user; determine a position of a portion of a portable device relative to the portion of the user; and generate an indication signal when it is determined that at least a portion of the portable device is in a defined position relative to the guidance indicator.

The apparatus may further comprise a display for presenting a representation of a portion of a user. The controller may be further configured to present the guidance indicator on the representation of the portion of the user; generate a marker representing the portion of the portable device; and present the marker representing the portion of the portable device on the representation of the user.

In some examples, the defined position may comprise an area either side of the guidance indicator, or an area having a boundary defined by the guidance indicator.

The apparatus may comprise one of a mirror, a smart mirror, a computing device, a tablet computer or a smart phone.

In some examples, the indication signal may comprise an indication signal selected from a group comprising: a signal to provide a visual indication on the display, a signal to provide an audible indication by the apparatus, and a signal to be sent to the portable device.

The controller may be configured to determine the position of the portion of the portable device based on at least one of position and/or orientation data emitted by the portable device; and a size and/or shape of a registration mark generated by the portable device.

The controller may be configured to determine whether the portion of the portable device is in contact with a surface of the user; and upon determining that the portion of the portable device is not in contact with the surface of the user, prevent the transmission of the indication signal to the portable device.

According to a further embodiment, a machine readable medium comprises instructions which, when executed by a processor, cause the processor to generate a guidance indicator relating to a portion of a user; determine a position of a portion of a portable device relative to the portion of the user; and generate an indication signal when it is determined that the portable device is in a defined position relative to the guidance indicator. In some embodiments, the machine readable medium may further comprise instructions which, when executed by the processor, cause the processor to generate a marker representing the portion of the portable device. In other embodiments, the machine readable medium may comprise instructions which, when executed by the processor, cause the processor to present the guidance indicator on a representation of the portion of the user, and present the marker on the representation of the portion of the user.

According to a further embodiment, an apparatus comprises a treatment element; a position identifier for enabling a determination to be made of a position of the treatment element relative to a user; a receiver for receiving a signal when it is determined that at least a portion of the treatment element is within a defined area on a surface of the user; and an indicator for indicating to the user that the treatment element is within the defined area.

An advantage this embodiment is that the apparatus may be caused to automatically take action to prevent, or at least reduce the chance of, an unintended treatment event. If the apparatus is moved into a position which is likely to result in the treatment element affecting an area of the user which is not intended to be affected, then the apparatus can indicate this to the user. If the apparatus is moved into an intended position, which is likely to result in a desired treatment, then the apparatus can indicate this to the user.

In some examples, the position identifier may comprise a light source; and a projector for projecting light generated by the light source to create a registration mark on the surface of the user, the projector being configured to project the light in a pattern representative of the treatment element.

When the treatment element is in contact with the surface of the user, the registration mark may comprise a line having a length equal to a length of the treatment element. The line may be projected onto the surface of the user adjacent to and aligned with the treatment element.

The indicator may comprise a haptic signal module to provide a haptic signal to the user via the apparatus.

According to a further embodiment, a system comprises a portable device as described above and an apparatus as described above.

These and other embodiments of the invention will become apparent from and elucidated with reference to the embodiments described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE PREFERRED EMBODIMENTS

Amongst other purposes, the invention may, in some examples, be used to ease the burden of a personal care activity. For example, the invention may be implemented when performing personal care activities including, but not limited to make-up application, make-up removal, skin care, hair care, and hair removal activities, such as shaving, epilating and trimming.

Figure 1:
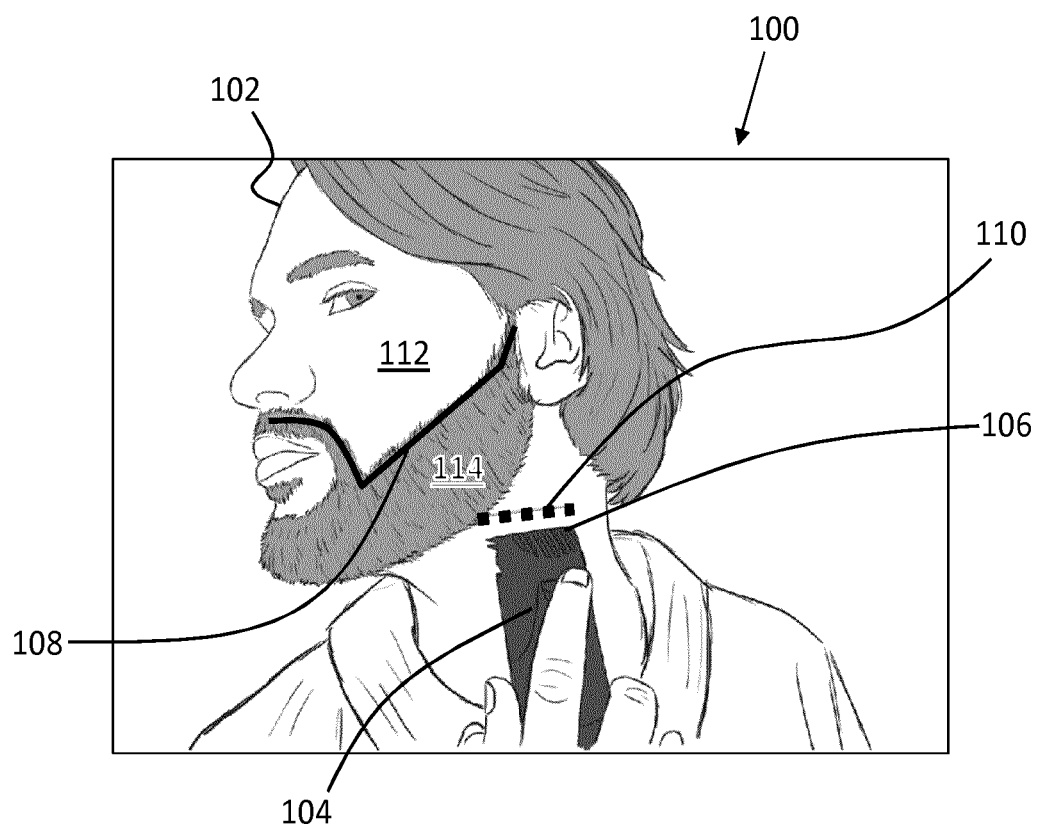
FIG. 1 is a representation of a user performing a personal care activity.

FIG. 1 shows various features of the invention implemented in one exemplary embodiment. FIG. 1 shows a representation 100 of a portion of a user 102 performing a personal care activity. In this example, the activity is trimming or shaving facial and/or body hair. The representation 100 shows the user 102 holding a treatment device, which in this example is shaver or trimmer. While the treatment device in this example is a grooming device 104 suitable for trimming hair, it will be appreciated that, in general, the invention could be applicable to various types of treatment, using treatment devices having treatment elements for performing a treatment function to the user. The grooming device 104 includes a grooming element 106 which, in this example, comprises at least one blade, or cutting element for cutting or trimming hair. The representation 100 also includes a guidance indicator 108 denoted, in this example, by a solid line, and a marker 110 denoted, in this example, by a dashed line. In this example, the user may intend to shave or trim hair in the area marked 112, but not in the area marked 114. The guidance indicator 108 and the marker 110 are discussed in greater detail below. In a general sense, however, the guidance indicator 108 and the marker 110 provide references with which to determine whether the user is using the grooming device 104 in a correct area. In some embodiments, they also serve to provide the user 102 with guidance as to where to perform the personal care activity.

Figure 2:
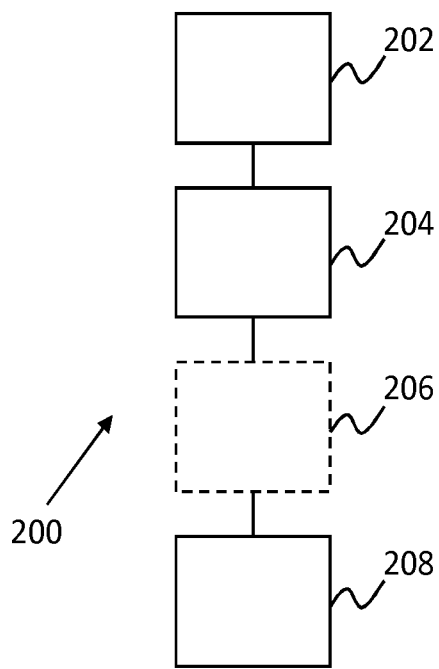
FIG. 2 is a flowchart showing an example method of guiding a user of a portable device according to an embodiment of the invention.

FIG. 2 is a simplified flowchart showing a method 200 for providing guidance to a user. The method 200 includes, at step 202, generating a guidance indicator 108 relating to a portion of a user 102.

As is discussed below, in some embodiments, the guidance indicator may be presented on a representation 100 of a portion of the user 102. The representation 100 of a portion of the user 102 may comprise, for example, a real time video image of the face of the user, the video image being captured, for example, by a video camera. The representation 100 may be presented on a display screen, such as a display screen of a television, a computing device, a tablet computer or a smart phone. Alternatively, the representation 100 may comprise a reflection of the user, for example in a smart mirror. The term 'smart mirror' used herein is intended to cover any mirror having additional functionality. An example of such a mirror is one which includes a television display, enabling a user to see his or her reflection at the same time as viewing a television image or stream. In other examples, the representation 100 may be a three dimensional representation, such as a hologram representation of the user. The representation 100, in one example, may comprise a virtual representation. In other words, the representation may not be physically presented on a display screen, or the like, but may exist virtually, such that necessary calculations and determinations may be performed by processing means, as required by the invention based on the known position of the guidance indicator 108 relative to the marker 110. A virtual representation may not be visible or presented to a user 102.

The guidance indicator 108 is, in some examples, a visual mark or indicator which may be presented on a representation 100 of the portion of the user 102. However, the guidance indicator 108 may be generated virtually by a computer or processing circuitry, such that a position of the guidance indicator is defined, but not displayed or presented to the user 102. In some examples, the guidance indicator 108 may be presented as a line, as shown in FIG. 1. In other examples, however, the guidance indicator 108 may be presented as a series of dots or dashes, or an area presented in the representation 100 to denote an area of the user 102 and the boundaries of that area.

The guidance indicator 108 may, for example, represent an edge shape of a beard that the user 102 intends to achieve as a result of the trimming or shaving activity. In some embodiments, the user 102 may select a particular beard shape from a library of beard shapes stored in a memory of a computer, for example. The selected beard, or one or more edges thereof, may be mapped virtually onto a virtual model or representation of a user, or may be shown on the representation 100 using the guidance indicator 108. In some examples, a representation of the selected beard may be displayed on the representation of the user 102 by overlaying or superimposing the image of the beard on the representation of the user. Thus, when viewing the representation 100, the user 102 can see a real time image or their reflection along with the guidance indicator 108, so that the user can see clearly where the personal care activity should be performed and where it should not be performed. In some embodiments, the guidance indicator 108 may be projected onto the user using projection means which, in some embodiments, may be located in or on the portable device.

The accurate positioning of the guidance indicator 108 on a model of the portion of the user 102, or the representation 100 may be achieve through the use of algorithms to determine the position and orientation of the portion of the user 102. Such algorithms may use facial feature recognition techniques.

At step 204, the method 200 comprises determining a position of a portion of a portable device 104 relative to the portion of the user 102. The portable device may, in some examples, comprise a personal care device, such as a treatment device, or the grooming device 104 shown in FIG. 1. The portion of the portable device may comprise a part of the portable device which performs the treatment, or grooming function of the device, such as the grooming element 106 of the grooming device 104 shown in FIG. 1.

The position of the portion of the portable device may be determined in a number of ways. In some embodiments, the portable device, or grooming device 104, may include components, such as a global positioning system (GPS) device, an inertial navigation system and/or an accelerometer which can be used by a processor in the device itself or in another computing system to determine the position and/or the orientation of the device and/or of a particular portion of the device relative to the portion of the user. For example, a processor of a computing device associated with the display or mirror may include a facial feature recognition module capable of recognising features of a face. The facial feature information may be used by a processor to determine the position and orientation of the user's face, and this information may be combined with information regarding the orientation and position of the portable device 104 to determine an accurate description of their positions relative to one another.

In other embodiments, the portable device 104 may include means for generating a registration mark which can be detected by a computing device associated with the display or mirror. The position of the registration mark may be indicative of the position of the portable device 104, or of a particular portion of the portable device, and may be used to determine the position and orientation of the device. For example, as discussed in greater detail below, some embodiments of the portable device may include a light source for generating light to be projected onto the user. The projected light forms a registration mark which may be detected by a detector associated with the display or the mirror, and the position, size and orientation of the registration mark may be used to determine the position and orientation of the portable device 104 or of a particular portion of the device. In some embodiments, the projected light may be in the visible spectrum such that the registration mark on the user is visible to the user directly and in a reflection, for example in the mirror. In other embodiments, the projected light may have a wavelength falling outside the visible range, such that the registration mark is not visible to the user. For example, the light may be in the infrared range. In this example, a suitable detector, such as an infrared detector, may detect the registration mark projected onto the user 102, which can be used to determine its position and orientation.

In some embodiments, the method 200 may further comprise, at step 206 (shown in FIG. 2 as a dashed line to indicate its non-essentiality), generating a marker 110 representing the portion of the portable device 104. The marker 110 may be computer-generated, for example by a computing device associated with the display or mirror, or may be a reflection of a registration mark generated by and projected onto the user by the portable device 104. For example, if the registration mark generated by the portable device 104 is not in the visible range, then the marker 110 may be computer-generated, and may be presented on the representation. However, if the registration mark generated by the portable device 104 is in the visible wavelength range, then it should be visible in a reflection in a mirror, or in a display showing a real time image of the user 102. Thus, in this case, the marker 110 presented on the representation 100 is a reflection or an image of the visible registration mark. In some embodiments, the marker is not presented to the user; instead, the position of the generated marker 110 is used to map the marker virtually onto a virtual model or representation of a user, which may then be used to determine relative positions and orientations of the marker and the guidance indicator 108.

When the marker 110 is presented to the user, the marker may, in some embodiments, comprise a plurality of dots representative of at least ends of a particular portion of the portable device 104. For example, in the case where the portable device 104 comprises a grooming device, the marker 110 may comprise two dots, one representing each end of the grooming element 106 of the device. In other embodiments, the portion of the portable device 104 may comprise a grooming element of a grooming device, such as a shaver or trimmer or, more generally, a treatment element of a treatment device. The marker may comprise a line representative of the grooming element of the grooming device, and the guidance indicator 108 may define an area or at least a portion of a boundary of an area into which the grooming element is not to be moved.

In embodiments of the invention in which step 206 is not performed (for example, when a determination of the relative positions of the portable device and the user is made without a marker being generated by the portable device), then the method 200 may proceed from step 204 to step 208.

Step 208 of the method 200 comprises generating an indication signal when it is determined that at least a portion of the portable device 104 is in a defined position relative to the guidance indicator 108. The position of the portable device 104 may be monitored in real time using processing means, such as a processor in a computing device associated with the display or the mirror. In some embodiments, the processor may generate an indication signal if, for example, any portion of the portable device 104 comes into contact with any portion of the guidance indicator 108, crosses any portion of the guidance indicator, or is detected within any area defined by the guidance indicator. In other examples, an indication signal may be generated if any portion of the portable device 104 moves within a defined distance of any portion of the guidance indicator 108.

In embodiments in which the marker 110 is generated, the marker may be a virtual marker (i.e. not visible to or presented to the user), or may be a visible marker.

Thus, while embodiments are discussed above in which the guidance indicator 108 may not be presented to the user 102, in some embodiments, the method may further comprise generating (at step 206) a marker 110 representing the portion of the portable device; presenting the guidance indicator on a representation 100 of the portion of the user 102, and presenting the marker 110 representing the portion of the portable device 104 on the representation of the portion of the user.

The indication signal may, for example, comprise at least one indication signal selected from a group comprising: a change in a colour of the marker 110, a change in a colour of the guidance indicator 108, an audible signal, a visual signal, a haptic signal, and an instruction to the portable device.

More specifically, in some embodiments, the indication signal may comprise a signal presented to the user 102 to make the user aware that the portable device or, when generated and displayed, the marker 110, is in a particular position relative to the guidance indicator 108. For example, the indication signal may comprise a signal to change a colour of the marker 110 and/or of the guidance indicator 108. In one example, the marker 110 may be shown in a green colour while it is positioned in an area that is to be treated (e.g. trimmed), and may change to a red colour if it is moved across the guidance indicator 108, or is moved into an area which is not to be treated. The indication signal may additionally or alternatively comprise a signal to present an audible or visual message or alert to the user, such as a flashing light on the display or mirror, or on the portable device, or a beeping sound generated by a speaker in the display, the mirror or the portable device.

In other embodiments, the indication signal may comprise a signal, such as an instruction signal, to be sent to the portable device 104, to instruct the portable device to take a particular action.

In some embodiments, the method may comprise generating a signal when it is determined that at least a portion of the portable device or, when generated, the marker 110, is in within a defined distance of the guidance indicator 108. In this scenario, the signal might be generated before any portion of the portable device or marker 110 contacts the guidance indicator 108, but a warning or alert signal may be provided to the user to warn him or her that the portable device or marker is close to the guidance indicator. Such an alert may become more prominent (e.g. an increasing volume of an audible warning sound) as the portable device or marker is moved closer to the guidance indicator, and may become less prominent (e.g. a decreasing volume of an audible warning sound) as the portable device or marker is moved away from the guidance indicator.

Figure 3:
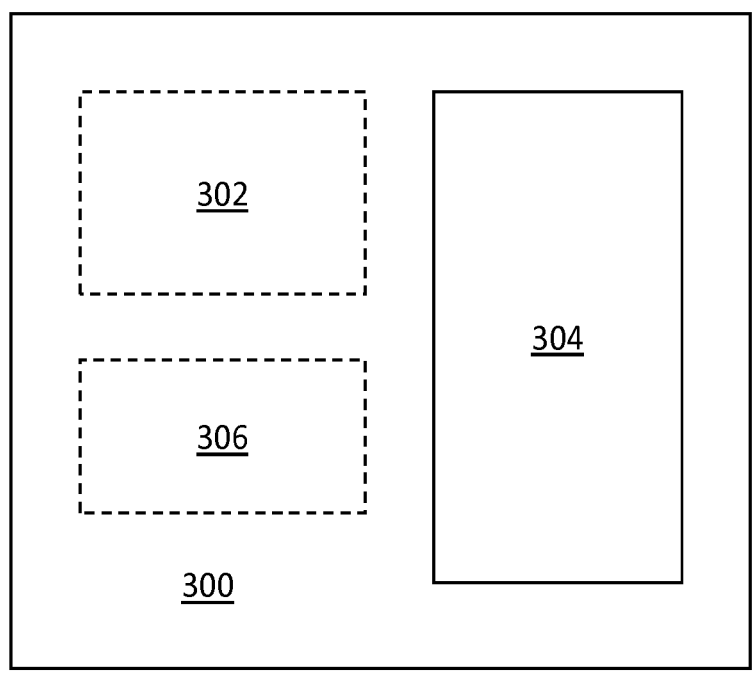
FIG. 3 is a simplified schematic of an example apparatus according to an embodiment of the invention.

The method 200 may be performed using a computer, or by one or more processors associated with the display or mirror. FIG. 3 shows an example apparatus 300 suitable for carrying out the method 200 described above. The apparatus 300 includes a controller 304 configured to generate a guidance indicator 108 relating to a portion of a user 102. The controller 304 is also configured to determine a position of a portion of a portable device 104 relative to the portion of the user 102. Specifically, the controller 304 may be configured to determine the position of the portion of the portable device 104 based on at least one of position and/or orientation data emitted by the portable device 104; and a size and/or shape of a registration mark generated by the portable device. In some embodiments, the guidance indicator 108 generated by the controller 304 may be projected onto the user by projection means. In such an embodiment, the guidance indicator 108 may be visible to the user 102 in a reflection in a mirror.

The controller 304 is further configured to generate an indication signal when it is determined that at least a portion of the portable device 104 is in a defined position relative to the guidance indicator 108. As discussed above, the indication signal may comprise an indication signal selected from a group comprising: a signal to provide a visual indication, a signal to provide an audible indication by the apparatus 300, and a signal to be sent to the portable device 104. In some embodiments, the controller 304 may be configured not to transmit a signal to the portable device if it is determined that the portable device is not in contact with a surface of the user 102, even though a portion of the portable device 104 has crossed the guidance indicator 108 or is within an area defined by the guidance indicator. Thus, the controller the controller 300 may be configured to determine whether the portion of the portable device 104 is in contact with a surface of the user; and upon determining that the portion of the portable device 104 is not in contact with the surface of the user, prevent the transmission of the indication signal to the portable device 104.

In some embodiments, the controller 304 may comprise control circuitry while, in other embodiments, the controller 304 may comprise one or more processors configured to execute instructions stored, for example, in a memory (not shown).

In some embodiments, apparatus 300 may comprise a display 302 for presenting a representation of a portion of a user. The controller may be configured to present the guidance indicator 108 on the representation 100 of the portion of the user 102; generate a marker 110 representing the portion of the portable device 104, and present the marker 110 representing the portion of the portable device 104 on the representation of the user.

The display 302 may comprise a display surface of a smart mirror or of a computing device such as tablet computer or a smart phone. Alternatively, the display may comprise a three-dimensional display, capable of presenting a three-dimensional representation of the user 102. Thus, the apparatus itself may, for example, comprise one of a smart mirror, a computing device, a tablet computer or a smart phone. The display 302 may be used to present a visual indication generated by the controller 304.

The apparatus 300 may, in some embodiments, include, or be associated with, a detector 306. The detector 306 (shown in FIG. 3 with a dashed line to indicate its non-essentiality) may be a camera for recording a real-time video stream of the user 102, which may be displayed on the display 302. In order to provide a sufficiently smooth video image of the user 102, the detector may be capable of imaging at around 30 frame per second. The detector 306 may include means for detecting signals in wavelengths outside the visible range, such as an infrared detector. The detector may also include means for detecting and receiving other signals, such as location and/or orientation signals emitted by the portable device 104. The received signals may be processed, for example, by the controller 304, or by separate processing circuitry (not shown). In some embodiments, the detector 306 may comprise a three-dimensional (3D), depth-sensing or stereo camera, capable of sensing or imaging a user and/or a portable device, such as a treatment device, and capable of measuring a distance between the user and at least a portion of the portable device. In such an embodiment, the position and orientation of the portable device, and its position and orientation relative to the user, can be determined without the need for the portable device to transmit any signal or marker (as discussed below) to indicate its position.

Figure 4:
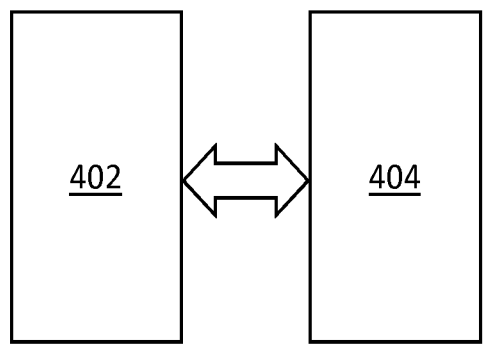
FIG. 4 is a simplified schematic of an example machine-readable medium with a processor to perform a method of guiding a user of a portable device according to an embodiment of the invention.

As mentioned above, the controller 304 may execute instructions stored, for example, in a machine readable medium. FIG. 4 shows a machine readable medium 402 associated with a processor 404. The machine readable medium 402 comprises instructions which, when executed by the processor 404, cause the processor to generate a guidance indicator 108 relating to a portion of a user 102; determine a position of a portion of a portable device 104 relative to the portion of the user 102; and generate an indication signal when it is determined that the portable device is in a defined position relative to the guidance indicator 108. More generally, the machine readable medium 402 may comprise instructions which, when executed by the processor 404, cause the processor to perform one or more steps of the method described above. The machine readable medium 402 may further comprise instructions which, when executed by the processor 404, cause the processor to generate a marker 110 representing the portion of the portable device 104. In some embodiments, the machine readable medium 402 may comprise instructions which, when executed by the processor 404, cause the processor to present the guidance indicator 108 on a representation 100 of the portion of the user 102, and present the marker 110 on the representation of the portion of the user.

Figure 5:
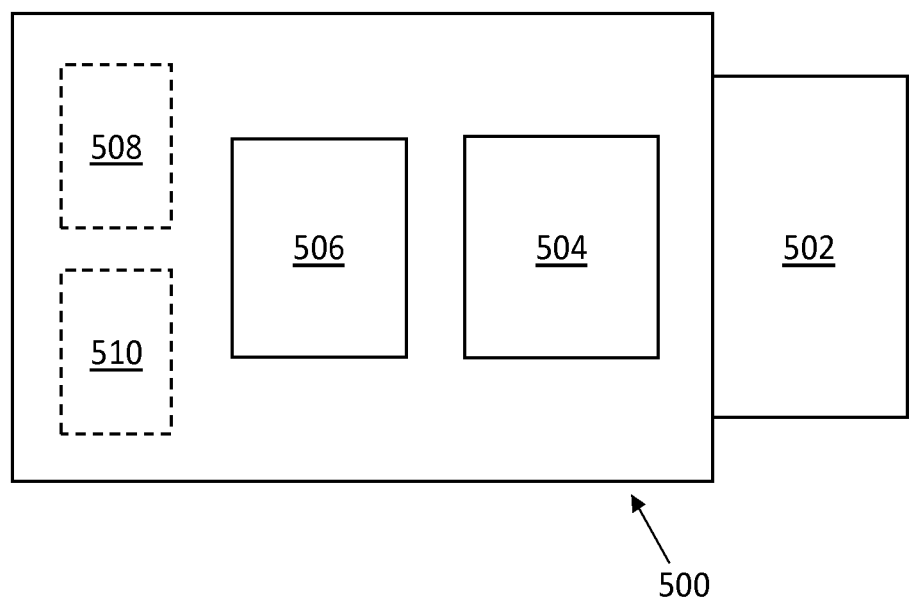
FIG. 5 is a simplified schematic of an example apparatus according to a further embodiment of the invention.

Reference is now made to FIG. 5, which shows, schematically, an apparatus 500 constructed in accordance with an embodiment of the invention. The apparatus 500 may comprise apparatus for treating a user, or for providing treatment. For example, the apparatus 500 may comprise a treatment device for use in performing a personal care activity, such as a make-up applicator, an epilator, a shaver or a trimmer. In some embodiments, the apparatus 500 may comprise a grooming device such as the device 104 shown in FIG. 1.

The apparatus 500 comprises a treatment element 502, such as a grooming element, which may comprise means for effecting a treatment of the user, such as a grooming activity. For example, the treatment element 502 may comprise a cutting element, blade assembly or other hair removal element suitable for cutting, trimming or shaving hair.

The apparatus 500 also includes a position identifier 504 for enabling a determination to be made of a position of the treatment element 502 relative to a user. As discussed above, the position of the treatment element 502 may be made in a number of ways, as will now be elucidated.

In some embodiments, the position identifier 504 may comprise a light source and a projector for projecting light generated by the light source to create a registration mark on the surface of the user, the projector being configured to project the light in a pattern representative of the treatment element 502. The light source may comprise a source of visible light, such as a laser, capable of generating a visible mark on the user 102 which can be seen by the user in a reflection or video image, and which may be detectable by the detector 306. Alternatively, the light source may comprise a source of radiation or light which is not visible to the human eye, but which may still be detectable by the detector 306. For example, the light source may comprise an infrared light source, capable of generating light which can create an infrared registration mark on the surface of the user 102. The projector of the position identifier 504 may comprise, for example, an optical guide or other optical components capable of directing light from the light source onto the surface of the user 102, in a pattern representative of the treatment element 502. In some embodiments, the projector may not be required, for example, when the light source is capable of generating light in the required pattern.

In some embodiments of the apparatus 500, the position identifier 504 may comprise a shape of at least a portion of the apparatus. For example, if a 3D or depth-sensing camera is used, then it may be configured to detect the apparatus or the treatment element 502 of the apparatus by their respective shapes and, from that information, determine the relative positions of the apparatus (and/or treatment element) and the user. In other embodiments, the position indicator 504 may comprise an indication, such as a mark, a sticker or a register, that is detectable by the 3D or depth-sensing camera, and from which the camera can determine the position and orientation of the apparatus 500.

In some examples, the registration mark may be a line having a length and shape similar to, or representative of, the length and shape of the treatment element 502. In other examples, the registration mark created by the position identifier 504 may comprise two or more dots configured to indicate at least ends of the treatment element 502.

The light source and/or the projector may be configured such that, when the treatment element 502 is in contact with the surface of the user 102, the registration mark comprises a line having a length equal to a length of the treatment element, and the line being projected onto the surface of the user is adjacent to and substantially aligned with the treatment element. In other words, when the user 102 holds the apparatus 500 such that the treatment element 502 is in contact with the surface, the registration mark is created at, or immediately adjacent to, the part of the surface that would be affected by the treatment element. In some embodiments, when the apparatus 500 is positioned away from (i.e. not in contact with) the surface, the shape and/or the length of the registration mark changes. For example, as the apparatus 500 is moved away from the surface of the user 102, the registration mark may become longer. The length and/or shape of the registration mark on the surface of the user 102 may be used by processing means associated with the mirror or display to determine the position of the treatment element 502 relative to the user. For example, a processor may determine the distance of the treatment element 502 from the surface of the user 102 based on the length of the registration mark on the surface.

In other embodiments, as discussed above, the position identifier 504 may comprise at least one of a global positioning system (GPS) device, an accelerometer and an inertial navigation system. The GPS device may provide detailed real time spatial coordinates representative of the apparatus's exact position. Using this information and details of the position and orientation of the user 102, a processor may determine the position of the apparatus 500 relative to the user. The accelerometer may provide detailed real time information regarding the orientation of the apparatus 500 and/or the treatment element 502. This information may also be used by a processor to determine the orientation of the apparatus 500 relative to the surface of the user 102. The inertial navigation system (INS) may include and/or use motion sensors and rotation sensors (such as accelerometers, gyroscopes, magnetometers and barometers) to calculate the position and orientation of the apparatus 500. An advantage of an inertial navigation system is that an external reference is not needed. In other embodiments, the position identifier 504 may emit electromagnetic fields which can be used by a sensor located, for example within or on a computer or mirror (such as on the apparatus 300) to determine the position and/or orientation of the apparatus 500.

In some examples, the position identifier 504 may include one or more visual marks or identifiers to enable the position and/or orientation of the apparatus 500 to be determined by visual object recognition means.

Referring again to FIG. 5, the apparatus 500 further comprises a receiver 506 for receiving a signal when it is determined that at least a portion of the treatment element 502 is within a defined area on a surface of the user 102. As discussed above, a controller 304 or other processing means which may be in, or associated with, the display or the mirror may determine from the position of the registration mark whether any portion of the treatment element 502 is within or outside of an area of the surface defined by the guidance indicator 108. In some embodiments, if it is determined that any portion of the treatment element 502 touches or crosses a boundary, or otherwise enters an area defined by the guidance indicator 108, then a signal may be transmitted to the receiver 506 of the apparatus 500.

In some embodiments, the apparatus 500 may further comprise a sensor (not shown) for measuring a distance of the treatment element 502 of the apparatus from the surface of the user 102, or features thereof, and determining a position of the treatment element relative to the user. The sensor may be connected to processing apparatus within the apparatus which can control the sensor and interpret data received by the sensor. Based on the data received by the sensor, a signal may be sent to the receiver 506 when at least a portion of the treatment element 502 is determined to be within a defined area on a surface of the user 102. In some embodiments, the sensor may be a camera which is capable of detecting depth, such as a three-dimensional camera. In other embodiments, the sensor may be a distance sensor.

In embodiments where the apparatus 500 is provided with a sensor, as described above, a separate detector (for example the detector 306 discuss above) may not be required. Instead, the sensor of the apparatus 500 may be used to determine the relative positions of the apparatus and the user 102. The guidance indicator 108 may be generated and projected onto the user 102 by a separate projector, and the user may use a regular mirror to see the location of the treatment element 502.

The signal may comprise an instruction signal to instruct the apparatus 500 to take action or perform a task in response to the determination.

The apparatus 500 further comprises at least one of: an indicator 508 for indicating to the user that the treatment element 502 is within the defined area; and a controller 510 for disabling the treatment element 502 when it is determined that the treatment element is within the defined area. In FIG. 5, the indicator 508 and the controller 510 are shown with dashed lines to denote that the apparatus 500 may include either or both of these components.

The indicator 508 of the apparatus 500 may include means for indicating to the user 102 that a portion of the treatment element 502 is within a defined area, or has crossed a boundary of that area. In some embodiments, the indicator 508 may comprise means for alerting the user, such as a light, a buzzer or a speaker. In other embodiments, the indicator 508 may comprise a haptic signal module to provide a haptic signal to the user via the apparatus. For example, the haptic signal module may cause a portion of the apparatus 500 to vibrate when a signal is received. In some examples, the indicator 508 may comprise means for changing a colour or wavelength of light generated by a light source in the position identifier 504.

The controller 510 may be configured to change an operating parameter of the treatment element or grooming element 502 in a number of ways. According to embodiments, change an operating parameter of the treatment element 502 may comprise at least one of: switching off the treatment element 502, and retracting the treatment element from the surface of the user 102. In other words, the controller 510 may cause power to the apparatus to be reduced or cut altogether so that the user 102 does not inadvertently cause a treatment effect (e.g. trimming or shaving hair) in an unintended area. Additionally, or alternatively, the controller 510 may cause the treatment element 502 to be moved away from the surface of the 102, or vary a parameter of the treatment element, for example, reducing the cutting or trimming length of a cutting element.

In some examples, the controller may be configured to operate the treatment element 502 when it is determined that the treatment element is not within the defined area, or when it is determined that the treatment element is within an area in which treatment is intended. For example, the controller may switch on the treatment element 502 when it is determined that the treatment is in an intended position and/or orientation.

In some embodiments, the apparatus 500 may include a projector or other suitable means for projecting the guidance indicator 108 onto the user 102. The projector may comprise a light source such as a laser source, capable of generating light in a pattern representing the guidance indicator. In some embodiments, the light source of the position identifier 504 may project the guidance indicator 108 onto the user 102.

The apparatus 500 may, in some examples, further comprise a detector, such as a camera and/or a sensor for determining depth or a distance between the apparatus and the portion of the user. In such examples, data received by the detector in the apparatus 500 may be used to determine the relative positions and/or orientations of the user and the apparatus.

A further aspect of the invention relates to a system, such as a personal care system, comprising a portable device and an apparatus. The portable device may communicate with the apparatus via known communication means, for example via a wired or wireless connection. The portable device may comprise the portable device 500 described above. The apparatus may comprise the apparatus 300 described above.

Figure 6:
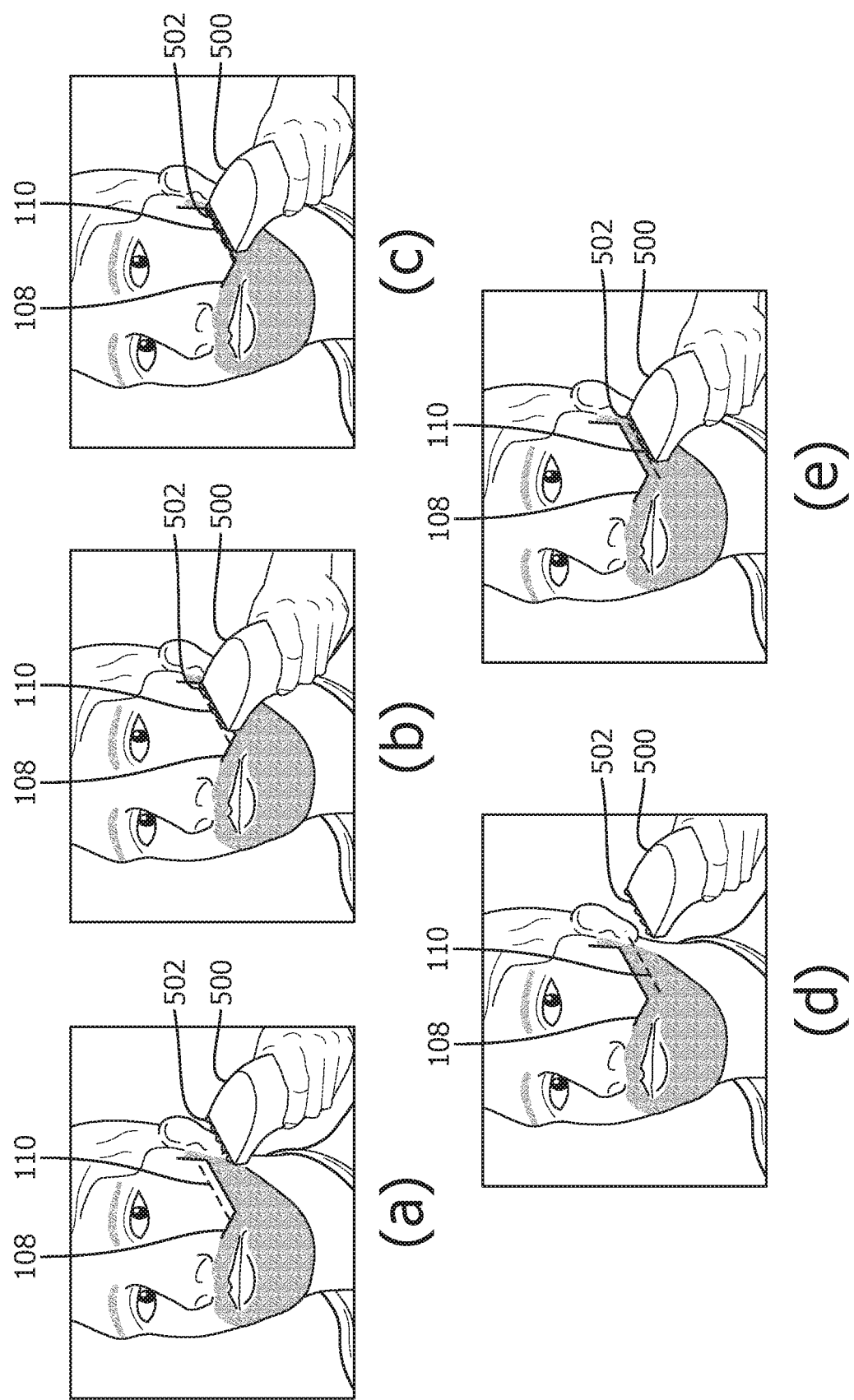
FIG. 6 is a series of images showing an apparatus according to an embodiment of the invention in use.

FIG. 6 shows a series of images (a) to (e) showing representations of a user 102 operating an apparatus 500 according to an embodiment of the invention. In the images of FIG. 6, the apparatus 500 is a beard trimmer, and includes a cutting or trimming element 502. The guidance indicator 108 presented on the representation of the user 102 is shown as a solid line. The marker 110 presented on the representation of the user 102 is shown as a dashed line.

In FIG. 6(a), the user 102 is holding the trimmer 500 away from the surface (i.e. his face), causing a marker 110 to be presented which is longer than the length of the cutting element 502. From the length of the marker 110, it may be determined that the cutting element 502 is not in contact with the surface. It may also be determined from the length of the marker 110 that, if the cutting element 502 is moved onto the surface at that position (i.e. above the guidance indicator), then the cutting element would be within a defined area. Thus, even though a portion of the marker 110 may appear touch or cross the guidance indicator 108 in FIG. (a), the cutting element 502 may continue to operate. In some embodiments, upon determining that the trimmer 500 is within an allowed area, a signal may be sent to commence operation of the cutting element.

In FIG. 6(*b*), the cutting element 502 is in contact with the user's face, and the marker 110 appears the same length as the cutting element. The marker 110 is within a defined "allowed" area (i.e. above the guidance indicator 108, or outside a "no-cut" area defined by the guidance indicator), so the cutting element may continue to operate. Similarly, in FIG. 6(*c*), the marker 110 is on the guidance indicator 108, and no portion of the marker has crossed into the area defined by the guidance indicator. Therefore, the cutting element may continue to operate.

In FIG. 6(*d*), the user 102 is again holding the trimmer 500 away from his face, so marker 110 is presented longer than the length of the cutting element 502. In this case, however, the marker 110 is entirely below the guidance indicator 108, or within the "no-cut" area defined by the guidance indicator. Therefore, in this scenario, a signal is sent to the trimmer to prevent operation of the cutting element 502. In FIG. 6(*e*), the cutting element 502 is in contact with the user's face, and the marker 110 is entirely below the guidance indicator 108. Therefore, the cutting element 502 is prevented from operating.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method comprising:
   generating a guidance indicator relating to a portion of a user;
   generating a marker representing a portion of a portable personal care device for performing a portable personal care treatment;
   presenting the guidance indicator on a representation of the portion of the user;
   presenting the marker representing the portion of the portable personal care device on the representation of the portion of the user;
   determining a position of the portion of the portable personal care device relative to the portion of the user, said determining based on a signal indicative of the position of the portion of the portable personal care device; and
   generating an indication signal when it is determined that at least a portion of the portable personal care device is in a defined position relative to the guidance indicator.

2. The method according to claim 1, wherein the marker comprises a plurality of dots representative of at least ends of the portion of the portable personal care device.

3. The method according to claim 1, wherein the portion of the portable personal care device comprises a treatment element of a treatment device;
   wherein the marker comprises a line representative of the treatment element of the treatment device; and
   wherein the guidance indicator defines an area or at least a portion of a boundary of an area into which the treatment element is not to be moved.

4. The method according to claim 1, wherein the marker is one of: a computer-generated marker; and a reflection of a registration mark generated by the portable personal care device.

5. The method according to claim 1, wherein the indication signal comprises at least one indication signal selected from a group comprising: a change in a colour of the marker, a change in a colour of the guidance indicator, an audible signal, a visual signal, a haptic signal, and an instruction to the portable personal care device.

6. An apparatus for providing guidance to a user, the apparatus comprising:
   a detector for receiving a signal indicative of a position of a portable personal care device for performing a portable personal care treatment; and
   a controller configured to:
      generate a guidance indicator relating to a portion of the user;
      generate a marker representing a portion of the portable personal care device;
      present the guidance indicator on a representation of the portion of the user;
      present the marker representing the portion of the portable personal care device on the representation of the portion of the user;
      determine a position of the portion of the portable personal care device relative to the portion of the user; and
      generate an indication signal when it is determined that at least a portion of the portable personal care device is in a defined position relative to the guidance indicator.

7. The apparatus according to claim 6, further comprising:
   a display for presenting the representation of the portion of a user.

8. The apparatus according to claim 6, wherein the indication signal comprises an indication signal selected from a group comprising: a signal to provide a visual indication, a signal to provide an audible indication by the apparatus, and a signal to be sent to the portable personal care device.

9. The apparatus according to claim 6, wherein the controller is configured to determine the position of the portion of the portable personal care device based on at least one of:
   position and/or orientation data emitted by the portable personal care device; and
   a size and/or shape of a registration mark generated by the portable personal care device.

10. The apparatus according to claim 6, wherein the controller is configured to:
   determine whether the portion of the portable personal care device is in contact with a surface of the user; and upon determining that the portion of the portable personal care device is not in contact with the surface of the user, prevent the transmission of the indication signal to the portable personal care device.

11. A portable personal care device for performing a portable personal care treatment, for use with the apparatus of claim 6, the portable personal care device comprising:
a treatment element;
a position identifier for enabling a determination to be made of a position of the treatment element relative to a user;
a receiver for receiving a signal when it is determined that at least a portion of the treatment element is within a defined area on a surface of the user; and
an indicator for indicating to the user that the treatment element is within the defined area.

12. The device according to claim 11, wherein the position identifier comprises:
a light source; and
a projector for projecting light generated by the light source to create a registration mark on the surface of the user, the projector being configured to project the light in a pattern representative of the treatment element.

13. The device according to claim 11, wherein the indicator comprises a haptic signal module to provide a haptic signal to the user via the apparatus.

14. A system comprising:
an apparatus according to claim 6; and
the portable personal care device.

15. A non-transitory machine readable medium comprising instructions which, when executed by a processor, cause the processor to:
generate a guidance indicator relating to a portion of a user;
generate a marker representing a portion of a portable personal care device for performing a portable personal care treatment;
present the guidance indicator on a representation of the portion of the user;
present the marker representing the portion of the portable personal care device on the representation of the portion of the user;
determine, based on a signal indicative of the position of a portion of the portable personal care device, a position of the portion of the portable personal care device relative to the portion of the user; and
generate an indication signal when it is determined that the portable personal care device is in a defined position relative to the guidance indicator.

* * * * *